Dec. 27, 1927. 1,654,037
J. CLARK
METHOD OF UNITING BUTTED EDGES OF METAL PARTS BY WELDING
Filed May 11, 1926  2 Sheets-Sheet 1
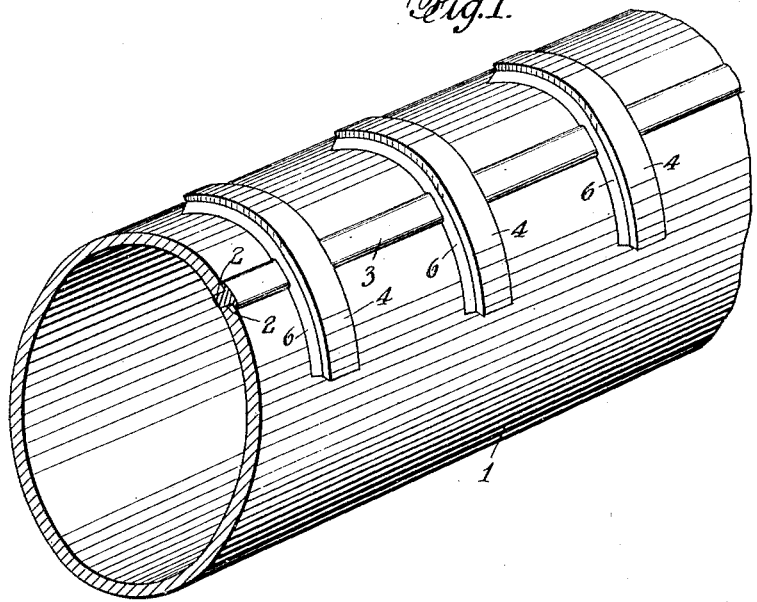
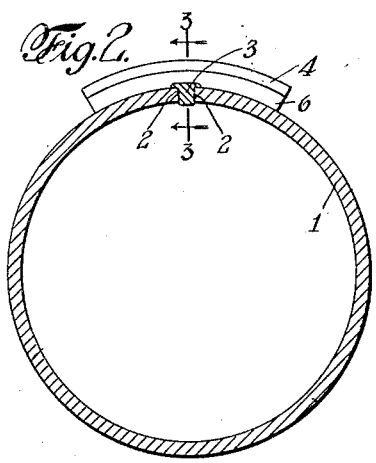
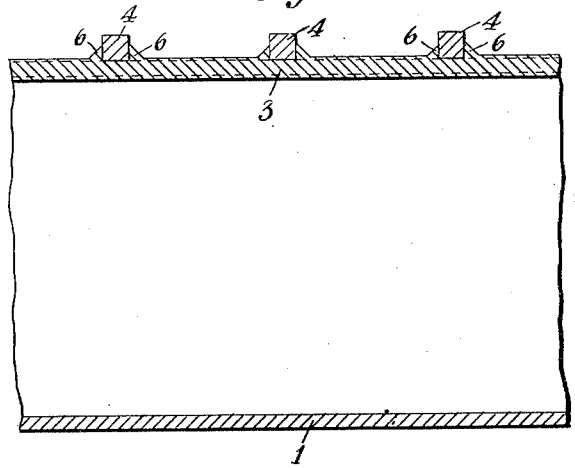
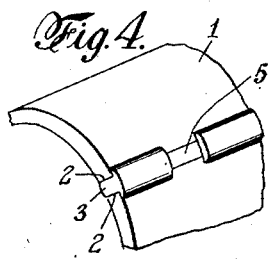

Dec. 27, 1927.
J. CLARK
1,654,037
METHOD OF UNITING BUTTED EDGES OF METAL PARTS BY WELDING
Filed May 11, 1926     2 Sheets-Sheet 2
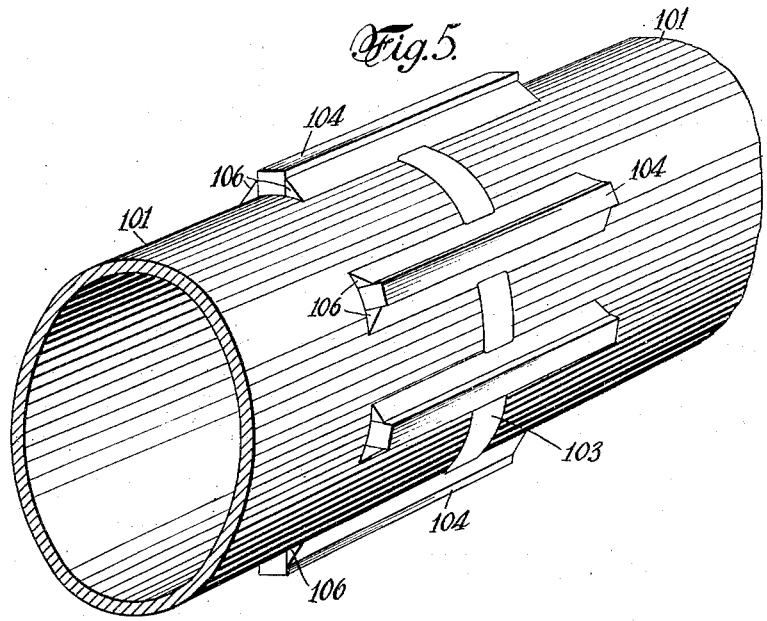
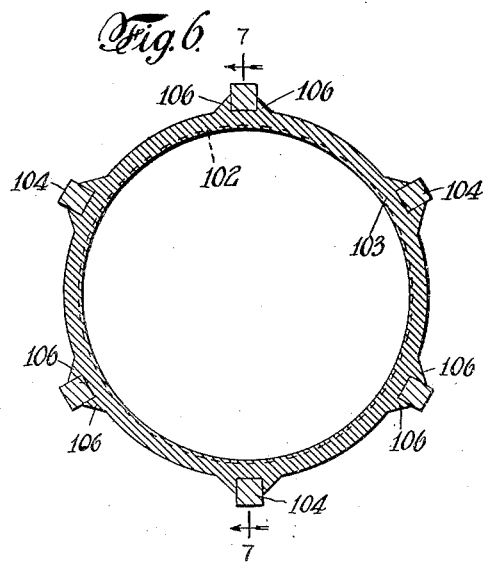
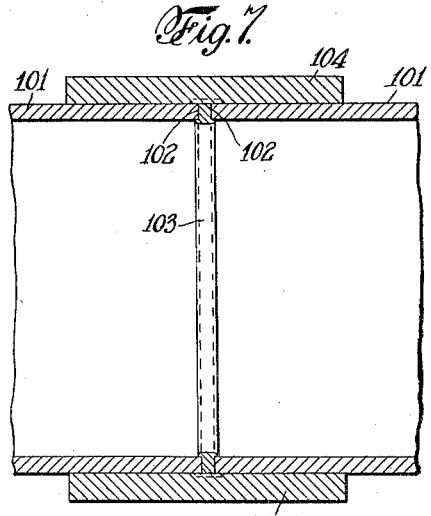
INVENTOR
James Clark
BY
ATTORNEY Patented Dec. 27, 1927.

1,654,037

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

METHOD OF UNITING BUTTED EDGES OF METAL PARTS BY WELDING.

Application filed May 11, 1926. Serial No. 108,246.

My invention consists in the novel features hereinafter described, reference being had to the accompanying drawing, which illustrates one embodiment of the same, selected by me for purposes of illustration and the said invention is fully disclosed in the following description and claims.

My invention consists in an improved method of joining the butted edges of metal parts, by welding, either by the oxy-acetylene process, or by the electric arc process. My invention is particularly desirable in welding together the sections of pipes in a pipe line, which are butted and united by the oxy-acetylene or electric arc process, although it can be employed for uniting any metal parts capable of being connected by welding. A welded joint, generally, has an efficiency less than an integral part of the same cross setion, and it is the aim of my invention to supply to a welded joint sufficient additional strength to bring it up to the full strength of the integral material of the parts united. For example, if it be assumed that a welded joint has an efficiency of 70%, of the integral metal parts of the same cross section, my invention will supply the additional 30% of strength necessary to bring the joint to the full strength of the integral material of which the parts joined, are composed. According to my invention, I provide the parts united by welded joints, with one or more strips or bars of metal extending perpendicularly to the line of the welded joint, which strips or bars are themselves welded to the parts on opposite sides of the line of the weld, for a sufficient distance from the weld on each side, so that it would be necessary to break the said strips or bars transversely before the parts connected by the welded joint may be separated, or the welded joint broken.

In the accompanying drawing, I have illustrated the application of my invention to a butt weld, connecting the meeting edges of a welded pipe, and I have also illustrated my invention applied to the connection of the butted ends of two coaxial pipe sections as in uniting such pipe sections in a pipe line. It will be understood, however, that my invention is applicable to any other pipes of joints in which butting edges of any particular or special care, may be united.

Referring to the accompanying drawing,

Fig. 1 represents a perspective view of a portion of the pipe section formed by bending a sheet of wrought metal into tubular form, with the edges butted and united, in accordance with my invention.

Fig. 2 represents a cross section of the pipe.

Fig. 3 is a section on line 3—3 of Fig. 2, through the weld, and one of the reinforcing pieces.

Fig. 4 is a partial perspective view showing a portion of the weld before the application of one of the reinforcing pieces.

Fig. 5 is a perspective view of butted portions of two pipe sections united in accordance with my present invention.

Fig. 6 is a cross section of Fig. 5, through the weld.

Fig. 7 is a longitudinal section on line 7—7 of Fig. 6.

Referring to Fig. 1, 1, represents a pipe or tube, in this instance formed by bending a sheet of wrought metal, as iron or steel, into cylindrical form, with the edges, 2—2, in butted relation. The edges, 2—2, are preferably welded together in any usual or desired manner. This may be done, for example, by means of the oxy-acetylene process, or the electric arc process, and the use of the usual welding rod, so as to form the weld, indicated at 3, or the edges may be welded together in any other desired manner. Across the line of the weld, 3, I place, at intervals, transversely disposed strips or bars, indicated at 4, and extending a considerable distance on each side of the line of the weld, and having their under surfaces preferably in contact with the portions of metal united by the weld, on opposite sides thereof. Where the weld, 3, extends above the surface of the adjacent marginal portions of the meeting edges, 2—2, I preferably cut away, by filing or otherwise, such projecting portions of the weld as indicated in Fig. 4, at 5, so that the under side of each of the transverse strips or bars, which for convenience of reference I term reinforcing strips or bars, may be seated on the united marginal portions on opposite sides of the weld, and be in continuous contact therewith throughout their length. In some instances, however, I might recess the central portions of said transverse reinforcing strips or bars, to bridge over the projecting portions of the weld, 3, but I prefer to have the transverse reinforcing strips or bars in continuous and uniform contact with the parts to be united throughout their length. In the case of a longitudinal pipe weld, such as shown in Figs. 1, 2 and 3, the reinforcing strips or bars, 4, will naturally be curved, as shown, so that their inner faces will be in continuous contact with the exterior surface of the pipe on opposite sides of the wall. Obviously if the parts to be united were in a single plane, the reinforcing strips or bars would be straight and if the meeting edges were concave, the reinforcing strips or bars would be curved accordingly. In other words, the reinforcing strips or bars will be given whatever form is necessary to enable their adjacent surface to conform to that of the parts on the opposite sides of the weld to which they are to be united.

The transversely disposed strips or bars, 4, are placed in position transversely of the weld and in contact with the marginal portions on opposite sides of the weld, and are then welded to said marginal portions, preferably throughout their length. This may be conveniently accomplished by either the oxy-acetylene process, or the electric arc process, and the usual welding rod, forming fillets, 6—6, on opposite sides of each reinforcing strip or bar throughout the length thereof, as indicated for example, in Figs. 1, 2 and 3. Where there is a long weld, 3, a sufficient number of these reinforcing strips, or bars, will be employed so that the strength of the pipe, or parts united by the weld shall be at least as great as that of the integral material of which the parts united is composed, and so that it would be necessary to tear apart the metal of the said transverse reinforcing strips or bars, transversely of the same, before the weld, 3, could be disrupted. This construction produces a joint of strength equal to or greater than that of the material of which the parts joined is composed and fully supplements any possible lack of efficiency of the ordinary welded joint.

In Figs. 5, 6 and 7, I have shown the application of my invention to the butt welding of two cylindrical pipes or tubes as in uniting pipe sections in a pipe line. In these figures, 101—101, represent two coaxially disposed pipe sections having their ends, 102, butted and welded together by the weld, 103, in any usual or preferred manner, as for example, by means of the oxy-acetylene process, or the electric arc process, with or without a welding rod. In this instance I have shown a plurality of reinforcing strips or bars, 104, placed across the weld, transversely thereof, and at intervals, in the manner hereinbefore described. In this instance the strips or bars will be straight and extend longitudinally of the pipe sections, and are preferably in contact with the metal beneath the same throughout their entire extent, the weld, 103, being filed away, if necessary, to permit this, or the under faces of the strips might be recessed, as above stated, if preferred. The strips or bars, 104, are then welded to the marginal portions of the adjacent pipe sections on opposite sides of the weld, preferably by the oxy-acetylene or electric arc process, and a welding rod, by the formation of fillets, 106, as shown. This makes a most satisfactory joint for the union of the butted ends of adjacent pipe sections and prevents the possibility of their separating at the weld, 103.

This is a very important application of my invention, as in the use of pipe lines having the ends of contiguous sections welded together, a great deal of trouble has been and is being experienced, due to the cracking or breaking of the welded joints, thus causing serious loss due to leakage of fluid, as natural and artificial gas, oil, etc., flowing through the pipe line. It is often extremely difficult in practice to locate these leaking joints, especially where the pipe lines are covered, and it is also difficult and expensive to repair such breaks where the pipe sections are united. In accordance with my invention, it is a practical impossibility for the joints to break or crack at the butt weld, as to do so, it would be necessary to tear apart the transversely disposed reinforcing strips or bars.

It will be noted from the foregoing that in the application of my invention no machine work is required on the pipe sections as the reinforcing strips are applied upon the exterior surfaces of the parts to be connected. In using the term "exterior surfaces" I refer to surfaces which are the normal or regular exterior surfaces as distinguished from sunken surfaces such as the surfaces produced by grooving or slotting. In other words, the reinforcing strips are laid flat upon the face of the metal so that it lies in a different plane from the joined edges which it extends across.

What I claim and desire to secure by Letters Patent is:—

1. The herein described method of uniting butted edges of wrought metal, which consists in welding said edges together, placing upon the exterior surfaces of the marginal portions adjacent to the weld a plurality of reinforcing strips or bars disposed transversely to the line of the weld, and extending on each side thereof, and having their contiguous faces in substantially uniform and continuous contact with the marginal portions on opposite sides of the weld, throughout the length of said strips, and welding said strips to said marginal portions on both sides of the weld connecting said butted edges, by the use of a welding rod and the formation of a fillet on each side of each of said reinforcing strips or bars.

2. The herein described method of uniting butt-edges of wrought metal parts, which consists in first welding such edges together to form a pressure tight union between them, placing a plurality of parallel reinforcing bars upon said parts transversely across the line of the weld at intervals longitudinally of the weld and welding them along both edges of each reinforcing bar to said parts, the welded union between said reinforcing bars and said parts being sufficiently extensive to prevent the opening of the main weld between such butt edges without breaking said reinforcing strips transversely thereof.

3. The herein described method of uniting the butt ends of adjacent pipe sections in a pipe line, which consists in forming a circular weld uniting said butt ends entirely around the same and forming a pressure tight union, applying to the exterior surfaces of the pipe sections a plurality of reinforcing bars extending longitudinally of said sections and extending on both sides of the line of said weld, and welding said bars on both sides to both pipe sections throughout the length of said bars, said bars having sufficient welding union with each pipe section to prevent the opening of the main weld between the butt ends thereof without breaking said reinforcing bars transversely thereof.

4. The herein described method of uniting pieces of wrought metal which consists in welding together adjoining edges of said pieces, applying a reinforcing strip of wrought metal to the external surfaces of said pieces, and welding such strip substantially throughout its length so that the line of weld of said strip is substantially perpendicular to the line of main weld and long enough to equal the strength of the metal in the strip whereby the main weld is prevented from opening without breaking said strip or strips transversely.

In testimony whereof I affix my signature.

JAMES CLARK.